(12) United States Patent
Claessens et al.

(10) Patent No.: US 9,873,758 B2
(45) Date of Patent: Jan. 23, 2018

(54) STORAGE STABLE POLYOL COMPOSITION FOR POLYURETHANE ELASTOMERS

(71) Applicant: Dow Global Technologies LLC, Midland, MI (US)

(72) Inventors: Sven Claessens, Lokeren (BE); Justin M. Virgili, Oakland, CA (US); Antoon De Smet, Oostburg (NL); Yme Braaksma, Axel (NL); Mark F. Sonnenschein, Midland, MI (US); Benjamin L. Wendt, Midland, MI (US)

(73) Assignee: Dow Global Technologies LLC

( * ) Notice: Subject to any disclaimer, the term of this patent is extended or adjusted under 35 U.S.C. 154(b) by 0 days.

(21) Appl. No.: 15/029,082

(22) PCT Filed: Nov. 25, 2014

(86) PCT No.: PCT/US2014/067304
§ 371 (c)(1),
(2) Date: Apr. 13, 2016

(87) PCT Pub. No.: WO2015/084635
PCT Pub. Date: Jun. 11, 2015

(65) Prior Publication Data
US 2016/0264712 A1  Sep. 15, 2016

Related U.S. Application Data

(60) Provisional application No. 61/910,466, filed on Dec. 2, 2013.

(51) Int. Cl.

| | |
|---|---|
| C08G 18/48 | (2006.01) |
| C08G 18/32 | (2006.01) |
| C08G 18/12 | (2006.01) |
| C08G 18/20 | (2006.01) |
| C08G 18/10 | (2006.01) |
| C08G 18/79 | (2006.01) |
| C08G 18/76 | (2006.01) |

(52) U.S. Cl.
CPC ......... *C08G 18/4808* (2013.01); *C08G 18/10* (2013.01); *C08G 18/12* (2013.01); *C08G 18/2063* (2013.01); *C08G 18/485* (2013.01); *C08G 18/4837* (2013.01); *C08G 18/4854* (2013.01); *C08G 18/7657* (2013.01); *C08G 18/797* (2013.01)

(58) Field of Classification Search
CPC .. C08G 18/4808; C08G 18/485; C08G 18/12; C08G 18/2063; C08G 18/4837; C08G 18/10; C08G 18/797; C08G 18/7657; C08G 18/4854; C08G 18/3206
See application file for complete search history.

(56) References Cited

U.S. PATENT DOCUMENTS

| | | | |
|---|---|---|---|
| 3,983,094 | A | 9/1976 | O'Shea |
| 4,101,439 | A | 7/1978 | Russell et al. |
| 4,202,957 | A | 5/1980 | Bonk et al. |
| 4,385,133 | A | 5/1983 | Alberino et al. |
| 5,648,447 | A | 7/1997 | Seneker et al. |
| 5,670,601 | A * | 9/1997 | Allen ............ C08G 18/10 525/123 |
| 5,962,619 | A | 10/1999 | Seneker et al. |
| 6,323,299 | B1 | 11/2001 | Handlin et al. |
| 6,503,997 | B1 * | 1/2003 | Saito ............ C08G 18/10 528/52 |
| 6,613,867 | B2 | 9/2003 | Sonnenschein et al. |
| 7,511,111 | B2 | 3/2009 | Lawrey et al. |
| 8,296,974 | B2 | 10/2012 | Sonnenschein et al. |
| 8,445,625 | B2 | 5/2013 | Suzuki et al. |
| 2006/0149021 | A1 * | 7/2006 | Lawrey ............ C08G 18/10 528/44 |
| 2008/0161440 | A1 * | 7/2008 | Marten ............ C08G 18/12 521/159 |

FOREIGN PATENT DOCUMENTS

| | | |
|---|---|---|
| EP | 0881244 A2 | 12/1998 |
| KR | 1050266 | 7/2011 |
| WO | 2015/084635 A1 | 6/2015 |

OTHER PUBLICATIONS

Sonnenschein, Mark F. et. al. Design, polymeriztion, and properties of high performance thermoplastic polyurethane elastomers form seed-oil derived soft segments, Polymer, 2013, 1350-1360, 54.
Virgil, Justin, et. al. A Novel Polyol for Use in High-Performance Polyurethane Applications, The Dow Chemical Co., Apr. 2013.
PCT/US2014/067304, International Search Report and Written Opinion, dated May 13, 2015.
PCT/US2014/067304, International Preliminary Report on Patentability. dated Jun. 7, 2016.

\* cited by examiner

*Primary Examiner* — Rabon Sergent

(57) ABSTRACT

A polyurethane reaction system includes an isocyanate component having at least one polyisocyanate and an isocyanate-reactive component having a storage stable polyol component that is a single phase liquid mixture at 23° C. including a first polyether polyol and a second polyether polyol. The first polyether polyol is included in an amount from 20 wt % to 90 wt %, based on total weight of the polyol component, is a glycol based polyoxypropylene-polyoxyethylene polyether polyol having number average molecular weight from 1500 g/mol to 1975 g/mol, and has a polyoxyethylene content from 26 wt % and 34 wt % based on a total weight of the first polyether polyol. The second polyether polyol is included in an amount from 10 wt % to 80 wt %, based on total weight of the polyol component, has a number average molecular weight from 750 g/mol to 4000 g/mol, and has a melting point higher than 23° C.

10 Claims, No Drawings

STORAGE STABLE POLYOL COMPOSITION FOR POLYURETHANE ELASTOMERS

FIELD

Embodiments relate to a storage stable polyol composition for forming polyurethane elastomers and polyurethane elastomers formed using the storage stable polyol composition.

INTRODUCTION

Polytetramethylene ether glycols (PTMEG) may be used in forming elastomers for use as, e.g., cast elastomers such as discussed in U.S. Pat. No. 5,962,619 and thermoplastic polyurethane such as discussed in U.S. Pat. No. 6,323,299. However, there are limitations with respect to the use of PTMEG in view of concerns about phase separation. Further, PTMEG based prepolymers tend to have high viscosities, which make the process of forming elastomers more difficult. Accordingly, alternative formulations that reduce or minimize phase separation, while still realizing high performance, are sought. Also, the development of polyoxypropylene-polyoxyethylene polyether polyol (PO/EO) polyether polyols has attracted recent attention to replace PTMEG in coating, adhesive, sealant, and/or elastomer (CASE) applications and thermoplastic polyurethane (TPU) applications to obtain high performance, cost-effective polyurethane systems (e.g., as discussed in U.S. Pat. No. 7,511,111). However, there is still a need for a polyol system that is both a storage stable liquid and capable of delivering material performance comparable to systems based only on PTMEG.

SUMMARY

Embodiments may be realized by providing a polyurethane reaction system that includes an isocyanate component having at least one polyisocyanate and an isocyanate-reactive component having a storage stable polyol component that is a single phase liquid mixture at 23° C. including a first polyether polyol and a second polyether polyol. The first polyether polyol is included in an amount from 20 wt % to 90 wt %, based on total weight of the polyol component, is a glycol based polyoxypropylene-polyoxyethylene polyether polyol having number average molecular weight from 1500 g/mol to 1975 g/mol, and has a polyoxyethylene content from 26 wt % and 34 wt % based on a total weight of the first polyether polyol. The second polyether polyol is included in an amount from 10 wt % to 80 wt %, based on total weight of the polyol component, has a number average molecular weight from 750 g/mol to 4000 g/mol, and has a melting point higher than 23° C. A cured reaction product of the isocyanate component and the isocyanate-reactive component has a Shore A hardness greater than 60 as measured according to ASTM D-2240, an ultimate tensile strength greater than 4500 psi as measured according to ASTM D-638, and a compression set at 23° C. of less than 15% as measured according to ASTM D-395B.

DETAILED DESCRIPTION

Polyurethane elastomers contain urethane moieties and are made by starting materials that include an isocyanate component and an isocyanate-reactive component. The isocyanate component includes at least one polyisocyanate. The isocyanate-reactive component includes a polyol component (e.g., that includes at least one polyol) and may include an optional additive component that includes at least one optional additive (e.g., a catalyst, a curative agent, a chain extender, a filler, a stabilizer, a surfactant, a blowing agent, and/or other additives that modify properties of the resultant final product). Compatibility within the starting materials is important because phase separation and polymerization occur concurrently when forming a final polyurethane product (such as an elastomer). If phase separation occurs too early, e.g., between the components that form the isocyanate-reactive component, the polymerization will not be complete. An incomplete polymerization may produce a low molecular weight polymer and/or leave unreacted isocyanate groups, which may lead to crosslinking by thermally induced reactions and/or reaction with water (or bubble formation leading to defects in an elastomer, adhesive, sealant, etc.). Accordingly, embodiments relate to the use of a storage stable polyol component that when used to form the isocyanate-reactive component is in the form of a single phase solution. According to embodiments, high-performance elastomer may be formed at a low cost, e.g., with respect to components and/or processing. For example, by use of the storage stable polyol according to embodiments, heating of the polyol for improving processability and/or mixing for improving solubility may be minimized and/or avoided.

Once the starting materials are mixed, the resultant reaction mixture is cured to form the polyurethane elastomers. The polyurethane elastomers may include segmented copolymers composed of hard and soft segments, and these polyurethane elastomers may get their strength from the phase separation of the soft segments from the hard segments. The hard segment may include the combination of the isocyanate and chain extender components and may be balanced by the soft segment. The polyurethane elastomers may include branching and/or exhibit crosslinking. For example, the polyurethane elastomers may be cast elastomers that are made by a casting process in which the starting materials are at least partially cured in an open or closed mold. Another exemplary embodiment includes thermoplastic polyurethane (TPU) elastomers, which are based on hard and soft segments with a nominal functionality of less than or equal to two and may have linear chains.

Without intending to be bound by this theory, the loss of mechanical performance in conventional polyols (e.g., polypropylene glycol based polyols) for CASE and TPU applications compared to polytetramethylene ether glycols (PTMEG)-based systems may be attributed to a lack of strain-induced crystallization in soft segments and/or the presence of unsaturation at chain ends in the conventional polyols leading to reduced molecular weight. According to embodiments, an improved glycol based polyether polyol delivers liquid processing at room temperature (e.g., 23° C.), storage stable low unsaturation alone or when mixed with another polyether polyol that has a melting point higher than 23° C., and/or optimization of microphase separation with respect to urethane hard segment chemistries (such as those comprised of methylene diphenyl diisocyanate and/or 1,4-butanediol) to enable formulation of high performance polyurethane systems.

According to exemplary embodiments, the cured reaction product of the high performance polyurethane system exhibits its high reactivity. For example, embodiments exhibit a Shore A hardness greater than 60, greater than 70, greater than 75, and/or greater than 80, as measured according to ASTM D-2240. Embodiments exhibit a compression set at 23° C. of less than 15%, less than 13%, less than 12%, and/or less than 10.5%, as measured according to ASTM D-395B. Exemplary embodiments exhibit a compression set at 70° C. of less than 50%, less than 45%, less than 40%, and/or equal to or less than 39%, as measured according to ASTM D-395B. Exemplary embodiments exhibit an elongation at break @ 23° C. of at least 600%, at least 1000%, at least 1200%, at least 1400%, and/or at least 1500%, as measured according to ASTM D-638).

According to exemplary embodiments, the reaction product of the high performance polyurethane system exhibits excellent tensile properties. For example, embodiments exhibit an ultimate tensile strength of at least 4500 psi (e.g., from 4500 psi to 15,000 psi, 5000 psi to 12,000 psi, 5200 psi to 10,000 psi, 5300 psi to 9,000 psi, 5300 psi to 7000 psi, etc.), as measured according to ASTM D-638. Exemplary embodiments exhibit a 300% tensile strength from of at least 800 psi (e.g., from 800 psi to 15,000 psi, 810 psi to 10,000 psi, 820 psi to 5000 psi, 850 psi to 3000 psi, 900 psi to 2000 psi, etc.), as measured according to ASTM D-638. The reaction product may exhibit low temperature flexibility. For example, exemplary embodiments exhibit a glass transition temperature, Tg, of below 20° C., below 0° C., below −5° C., below −10° C., below −15° C., and/or from −15° C. to −50° C.).

The isocyanate component includes at least one polyisocyanate (e.g., at least one of aliphatic, cycloaliphatic, alicyclic, arylaliphatic, aromatic polyisocyanates, and derivatives thereof that include allophanate-modified, biuret-modified, and NCO terminated prepolymer). Exemplary polyisocyanates include diphenylmethane diisocyanate (MDI), toluene diisocyanate (TDI), m-phenylene diisocyanate, p-phenylene diisocyanate (PPDI), naphthalene diisocyanate (NDI), isophorone diisocyanate (IPDI), hexamethylene diisocyanate (HDI), and various isomers and/or derivatives thereof. Using at least one of its 2,4'-, 2,2'-, and 4,4'-isomers, MDI may have a polymeric, a copolymer, a mixture, or a modified polymer form. Exemplary MDI products are available from The Dow Chemical Company under the trade names ISONATE, PAPI, and VORANATE. Using at least one of its 2,4 and 2,6-isomers, TDI may have a polymeric, a copolymer, a mixture, or a modified polymer form. Exemplary TDI products are available from The Dow Chemical Company under the trade name VORANATE. For example, the polyisocyanate may be an MDI derived NCO terminated prepolymer that is prepared using MDI and a portion of the storage stable polyol of the isocyanate-reactive component. According to an exemplary embodiment, the at least one polyisocyanate of the isocyanate component has a nominal functionality from 2.2 to 3.2 (e.g., 2.8 to 2.9, etc.) and a free isocyanate group content (i.e., NCO content) from 25 wt % to 35 wt % (e.g., 30 wt % to 32 wt %).

The isocyanate-reactive component includes a polyol component. The polyol component could include only one polyol (such as a first polyether polyol) or one or more polyols (such as the first polyether polyol and a second polyether polyol that is different from the first polyether polyol). According to embodiments, the polyol component includes the first polyether polyol in an amount from 20 wt % to 90 wt % and the second polyether polyol in an amount from 10 wt % to 80 wt %, based on total weight of the polyol component. The polyol component is a storage stable polyol mixture that is storable as a single phase liquid mixture at 23° C. In particular, the storage stable polyol component is a clear solution that is free of two or more separate liquid layers so as to be determined to be a homogenous single liquid phase mixture for at least 13 days. For example, the storage stable polyol component at 23° C. may be a single phase liquid mixture for at least 13 days of the first polyether polyol that is a liquid at 23° C. and the second polyether polyol that is a solid particulate at 23° C.

According to exemplary embodiments, the amount of the first polyether polyol is from 20 wt % to 80 wt % (e.g., 20 wt % to 75 wt %, 20 wt % to 65 wt %, 20 wt % to 55 wt %, 30 wt % to 50 wt %, 45 wt % to 55 wt %, etc.). According to exemplary embodiments, the amount of the second polyether polyol is from 20 wt % to 75 wt % (e.g., 20 wt % to 70 wt %, 20 wt % to 65 wt %, 20 wt % to 55 wt %, 30 wt % to 50 wt %, 45 wt % to 55 wt %, etc.). The first and the second polyether polyols may account for a 100 wt % of the total amount of polyols in the isocyanate-reactive component.

The optional additive component, if included, may account for less than 50 wt % of the isocyanate-reactive component. The optional additive component of the reaction mixture for forming the polyurethane resin may be in its entirety or partially mixed with the isocyanate component and/or the isocyanate-reactive component. According to an exemplary embodiment, a portion of the optional additive component such as a catalyst is added to the isocyanate-reactive component before the reaction mixture is formed. Another portion such as a chain extender (e.g., 1,4-butanediol) may be added separately or as part of the isocyanate reactive component to the reaction mixture. If the optional additive component is excluded, the storage stable polyol mixture may consist essentially of the first and second polyether polyols.

The first polyether polyol is a glycol based polyoxypropylene-polyoxyethylene polyether polyol that has a number average molecular weight from 1500 g/mol to 1975 g/mol (e.g., 1600 g/mol to 1950 g/mol, 1700 g/mol to 1900 g/mol, 1800 g/mol to 1880 g/mol, 1820 g/mol to 1870 g/mol, 1840 g/mol to 1860 g/mol, etc.). A polyoxyethylene content of the first polyether polyol is from 26 wt % and 34 wt % (e.g., 26 wt % to 32 wt %, 26 wt % to 30 wt %, 27 wt % to 29 wt %, approximately 28 wt %, etc.), based on a total weight of the first polyether polyol. A polyoxypropylene content of the first polyether polyol is from 66 wt % to 74 wt %, based on a total weight of the first polyether polyol. For example, the first polyether polyol may be an ethylene oxide capped diol in which a polyoxypropylene glycol is reacted further with ethylene oxide giving rise to oxyethylene groups on each end of the diol.

A hydroxyl number of the first polyether polyol may be from 50 mg KOH/g to 65 mg KOH/g (e.g., 50 mg KOH/g to 60 mg KOH/g, 52 mg KOH/g to 58 mg KOH/g, 54 mg KOH/g to 58 mg KOH/g, etc.). The first polyether polyol may have a nominal hydroxyl functionality of approximately 2. The first polyether polyol may have a low monol content and/or degree of unsaturation of less than 0.0200 meq/g (e.g., less than 0.0185 meq/g and/or less than 0.0150 meq/g), as measured according to ASTM D-4671. The first polyether polyol may have a viscosity of 100 cp to 140 cp at 40° C. Hydroxyl group percentage of the first polyether polyol may be from 1.79 wt % to 1.91 wt % (e.g., 1.84 wt % to 1.88 wt %, etc.), as measured according to ASTM D4274 D. A pH level of the first polyether polyol may be from 6.5 to 8.0 (e.g., 7.4 to 7.8, etc.). A water content of the first polyether polyol based on a total weight of the first polyether polyol may be less than 0.04 wt %, as measured according to ASTM D4672. A viscosity at 25° C. of the first polyether polyol may be from 275 to 305 centistokes (e.g., 285 cSt to 295 cSt, etc.), as measured according to ASTM D4878.

The second polyether polyol has a number average molecular weight from 750 g/mol to 4000 g/mol (e.g., 800 g/mol to 3500 g/mol, 850 g/mol to 3000 g/mol, 900 g/mol to 3000 g/mol, 950 g/mol to 2200 g/mol, 980 g/mol to 2020 g/mol, 1000 g/mol to 2000 g/mol, etc.). The number average molecular weight of the second polyether polyol may be greater than the number average molecular weight of the first polyether polyol. A melting point of the second polyether polyol is higher than 23° C. (e.g., between 24° C. and 45° C., between 24° C. and 40° C., between 24° C. and 35° C., between 24° C. and 34° C., between 24° C. and 33° C., etc.). For example, the second polyether polyol may be a solid particle at 23° C. The second polyether polyol may have a viscosity at 40° C. that is at least 250 centistokes (e.g., 260 cSt to 1500 cSt, etc). The second polyether polyol may consist essentially of polytetramethylene ether glycol (PTMEG), e.g., a PTMEG having a number average molecular weight from 980 g/mol to 2020 g/mol. The PTMEG may be prepared by the ring-opening polymerization of tetrahydrofuran, e.g., in the presence of a Lewis acid catalyst.

The optional additive component may include an optional catalyst component that includes at least one catalyst. Exemplary catalysts include tertiary amines, Mannich bases formed from secondary amines, nitrogen-containing bases, alkali metal hydroxides, alkali phenolates, alkali metal alcoholates, hexahydrothiazines, and organometallic compounds. For example, the catalyst component may include at least one tin and/or amine based catalyst, e.g., that accounts for less than 5 wt % of a total weight of the isocyanate-reactive component.

The amine based curing agent may be a bifunctional organic diamine compound (such as a toluene based diamine, a phenyl based diamine, an alkyl based dianiline, a polyether based diamine, or an isophorone based diamine) or a trifunctional organic diamine compound (such as a phenyl based triamine, an alkyl based tramine, or a propylene based triamine). Exemplary amine based curing agents are available from Albemarle Corporation under the trademark Ethacure. According to an exemplary embodiment, the curative component may include a dimethyl toluene diamine curing agent, quaternary ammonium compounds, phosphonium compounds, sulfonium compounds, tertiary amines, metal hydroxides, and metal alkoxides.

The viscosity of the isocyanate component may be reduced by the mixing diluents therewithin, e.g., diluents that are commercial available (e.g., diluents known to those skilled in the art may be used). The isocyanate-reactive component may exclude any diluents for reducing the viscosity thereof. Various other additives, e.g., those known to those skilled in the art, may be included in the optional additive component. For example, fillers such as inorganic and/or organic fillers, coloring agents, water-binding agents, surface-active substances, plant protection agents, extenders and/or plasticizers may be used.

The optional chain extender component may include at least one chain extender that has two isocyanate-reactive groups per molecule and may have an equivalent weight per isocyanate-reactive group of less than 400. Exemplary chain extenders include 1,4-butanediol, ethlyene glycol, and diethylene glycol. The chain extender may be blended with the first and second polyether polyols as part of the storage stable polyol component. If included, the chain extender component may be present in an amount from 0.1 wt % to 20 wt % (e.g., 5 wt % to 18 wt %, etc.), based on a total weight of the polyol component.

The optional crosslinker component may include at least one crosslinker that has three or more isocyanate-reactive groups per molecule and an equivalent weight per isocyanate-reactive group of less than 400. For example, the crosslinker may include from 3 to 8 (e.g. 3 or 4) primary hydroxyl, primary amine, or secondary amine groups per molecule, and may have an average equivalent weight from 30 to about 300. If included, the crosslinker component may be present in an amount from 0.1 wt % to 15 wt % (e.g., 0.2 wt % to 10 wt %, etc.), based on a total weight of the second component.

Various other additives may be added to adjust characteristics of the resultant polyurethane product (including CASE), e.g., those known to those skilled in the art may be used. For example, pigments (such as titanium dioxide and/or carbon black), may be used to impart color properties. Pigments may be in the form of solids or the solids may be pre-dispersed in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the protective coating. Dyes and/or pigments (such as titanium dioxide and/or carbon black), may be included in the optional additive component to impart color properties to the polyurethane resin. Pigments may be in the form of solids or a dispersion in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the polyurethane resin.

The isocyanate-reactive component may be reacted with the isocyanate component at an isocyanate index from 80 to 200 (e.g., 80 to 150, 80 to 120, 90 to 120, 95 to 110, etc.). The isocyanate index is measured as the equivalents of isocyanate in the reaction mixture for forming the polyurethane resin, divided by the total equivalents of isocyanate-reactive hydrogen containing materials in the reaction mixture, multiplied by 100. Considered in another way, the isocyanate index is the ratio of isocyanate-groups over isocyanate-reactive hydrogen atoms present in the reaction mixture, given as a percentage.

Use of the storage stable polyol may reduce the cost and/or time involved in manufacturing polyurethane elastomers using the isocyanate and isocyanate-reactive component according to embodiments. For example, heating of a mixture of the first and second polyether polyols for improving processability and/or mechanical mixing of the first and second polyether polyols for improving solubility may be minimized and/or avoided. According to an exemplary embodiment, when the storage stable polyol is used to form a polyurethane product/reaction system, the isocyanate component is mixed with the isocyanate-reactive component without pre-heating the isocyanate-reactive component (the isocyanate-reactive component including the storage stable polyol).

The elastomers are useful, e.g., in applications where modulus, abrasion resistance, toughness, and/or retention of properties in various environmental conditions are important as in coating, a film, or a sealant, as well as in a variety of articles including cast articles, injection molded articles, and extruded articles, such as films or sheets for stamping, cutting, molding and/or thermoforming into articles. The elastomers may exhibit good combinations of light transmission and clarity, tensile strength, low temperature flexibility, and moisture vapor transition rates.

All parts and percentages herein are by weight, unless otherwise indicated. All descriptions of molecular weight are based on a number average molecular weight, unless otherwise indicated.

EXAMPLES

The following materials are principally used:

Polyol A glycol based polyoxyethylene/polyoxypropylene polyol, having a low monol content of less than 0.0185 meq/g, an average polyoxyethylene content of 28 wt %, and a number average molecular weight of 1850 g/mol.

Polyol B A glycol based polyoxyethylene/polyoxypropylene polyol, having an average polyoxyethylene content of 25 wt % and a number average molecular weight of 1850 g/mol.

Polyol C A glycol based polyoxyethylene/polyoxypropylene polyol, having an average polyoxyethylene content of 35 wt % and a number average molecular weight of 1850 g/mol.

Poly-G® 55-56 A polyoxyethylene/polyoxypropylene polyol, having an average nominal hydroxyl functionality of 2, an average polyoxyethylene content of approximately 43-44 wt %, and a number average molecular weight of 2,000 g/mol (available from Lonza).

PTMEG 1000 A poly(tetramethylene ether) glycol polyol having a number average molecular weight of 1000 g/mol and a melting point of approximately 25° C. (available from Invista as TERATHANE® 1000).

PTMEG 2000 A poly(tetramethylene ether) glycol polyol having a number average molecular weight of 2000 g/mol and a melting point of approximately 28° C. (available from Invista as TERATHANE® 2000).

ISONATE™ 143L A polycarbodiimide-modified diphenylmethane diisocyanate (available from The Dow Chemical Company).

ISONATE™ 125M A MDI based mixture including on average 98 wt % 4,4'-diphenylmethane diisocyanate and 2 wt % of 2,4'-diphenylemethane diisocyanate and having an average NCO content of 33.5 wt % (available from The Dow Chemical Company).

BDO A chain extender that is made of 1,4-butanediol (available from Sigma-Aldrich).

Catalyst A mixture of Polycat® DBU (1,8-diaza-bicyclo-[5,4,0]-undecene, available from Air Products and Chemicals) and triethylenediamine dissolved in glycol.

Referring to Table 1, below, Polyol A, B, and C are tested for miscibility with PTMEG 1000 and PTMEG 2000 polyols at 23° C., over a time period of 13 days. In particular, Samples 1 to 6 (according to the formulations in Table 1) having a total weight of 10 grams are each independently mixed at 23° C. using a vortex mixer in a 20 mL glass vial. Then the mixed Samples 1 to 6 are stored at 23° C. and are visually inspected for phase separation over a 13 day period of time. A clear solution that is free of two or more separate liquid layers is determined to be a homogenous single liquid phase mixture (i.e., an observation of 1P). A sample that exhibits an observation of 1P as of the $13^{th}$ day is determined to be a storage stable liquid polyol. A cloudy solution or solution in which two or more liquid layers (or each of a liquid layer and a solid layer) are evident is determined to be phase separated (i.e., an observation of 2P). With an observation of 2P, the two phases may include two immiscible liquids or semi-crystalline solids suspended therein in a liquid. An observation of SCS (i.e., semi-crystalline solid) indicates the sample mixture has solidified into a semi-crystalline solid (i.e., only a single phase solid is observed) that is a not a storage stable liquid polyol.

TABLE 1

| Sample Number | Description of Sample | Time (days) | Observation |
|---|---|---|---|
| 1 | 50 wt % of Polyol A | 0 | 1P |
|   | 50 wt % PTMEG 1000 | 13 | 1P |
| 2 | 50 wt % of Polyol A | 0 | 1P |
|   | 50 wt % PTMEG 2000 | 13 | 1P |
| 3 | 50 wt % of Polyol B | 0 | 1P |
|   | 50 wt % PTMEG 1000 | 4 | 2P |
|   |   | 13 | 2P |
| 4 | 50 wt % of Polyol B | 1 | 2P |
|   | 50 wt % PTMEG 2000 | 6 | SCS |
| 5 | 50 wt % of Polyol C | 0 | 1P |
|   | 50 wt % PTMEG 1000 | 9 | 2P |
|   |   | 13 | 2P |
| 6 | 50 wt % of Polyol C | 0 | 1P |
|   | 50 wt % PTMEG 2000 | 2 | 2P |
|   |   | 6 | SCS |

Prepolymer Samples 7-11 are prepared using Polyol A and PTMEG 1000 according to the formulations in Table 2, below. In particular, the polyol component in Sample 7 includes 100 wt % of Polyol A (based on a total weight of the polyol component used in Sample 7), Sample 8 includes 75 wt % of Polyol A and 25 wt % of PTMEG 1000 (based on a total weight of the polyol component used in Sample 8), Sample 9 includes 50 wt % of Polyol A and 50 wt % of PTMEG 1000 (based on a total weight of the polyol component used in Sample 9), Sample 10 includes 25 wt % of Polyol A and 75 wt % of PTMEG 1000 (based on a total weight of the polyol component used in Sample 10), and Sample 11 includes 100 wt % of PTMEG 1000 (based on a total weight of the polyol component used in Sample 11). Samples 7-11 are prepared using prepolymers that are synthesized at 60° C. (2 hr) using approximately 40 to 43 grams of the polyol component, approximately 4 grams of ISONATE™ 143 L, approximately 29 to 31 grams of ISONATE™ 125M, and approximately 0.005 grams of benzoyl chloride.

The resultant prepolymers are then combined with a curative side at a mixture ratio by weight of 3 to 1. The curative side includes approximately 17 to 18 grams of the polyol component, approximately 7 to 8 grams of BDO, and approximately 500 ppm of the Catalyst. The resultant prepolymers and the curative side are combined at an isocyanate index of 105 to form a reaction mixture. The reaction mixture is then immediately cast into a heated, open mold at 80-90° C. Then, the reaction product is de-molded as a quasi-elastomeric sample after approximately 5 minutes and then post-cured at 80° C.-90° C. for 16 hr.

TABLE 2

| Sample Number | Polyol Composition | Shore A | UTS (psi) | 300% TS (psi) | Elong @ break (%) | $T_g$ (°C.) | 23° C. C.S. (%,) | 70° C. C.S. (%) |
|---|---|---|---|---|---|---|---|---|
| 7  | 100/0  | 83 | 5370 | 820 | 2340 | −27 | 10 | 29 |
| 8  | 75/25  | 83 | 5360 | 860 | 2010 | −20 | 7  | 33 |
| 9  | 50/50  | 83 | 5410 | 830 | 1940 | −19 | 10 | 39 |
| 10 | 25/75  | 84 | 6310 | 950 | 1670 | −17 | 6  | 39 |
| 11 | 0/100  | 85 | 5380 | 940 | 1420 | −12 | 7  | 48 |

As demonstrated in Table 2, above, properties as good as or better than only PTMEG systems may be obtained using a low monol content glycol based polyoxyethylene/polyoxypropylene polyol (i.e., Polyol A). Referring to Table 2, above, shore hardness A is determined according to ASTM D-2240. Ultimate tensile strength is determined according to ASTM D-638, and 300% tensile strength is measured according to ASTM D-638. Elongation at break is measured according to ASTM D-638. The glass transition temperature, Tg, is determined using dynamic mechanical analysis. The acronym C.S. in Table 2 indicates compression set (measured after a 24 hour period at specified temperature), and C.S at 23° C. and C.S. at 70° C. are measured according to ASTM D-395 B.

The invention claaimed is:

1. A polyurethane reaction system, comprising
an isocyanate component that includes at least one polyisocyanate
an isocyanate-reactive component that includes a storage stable polyol component having a single phase liquid mixture at 23° C. including:
  a first polyether polyol in an amount from 20 wt % to 90 wt %, based on total weight of the polyol component, the first polyether polyol being a glycol based polyoxypropylene-polyoxyethylene polyether polyol having number average molecular weight from 1500 g/mol to 1975 g/mol and a polyoxyethylene content from 26 wt % to 34 wt % based on a total weight of the first polyether polyol, and
  a second polyether polyol in an amount from 10 wt % to 80 wt %, based on total weight of the polyol component, the second polyether polyol having a number average molecular weight from 750 g/mol to 4000 g/mol and a melting point higher than 23° C.,
wherein a cured reaction product of the isocyanate component and the isocyanate-reactive component has a Shore A hardness greater than 60 as measured according to ASTM D-2240, an ultimate tensile strength greater than 4500 psi as measured according to ASTM D-638, and a compression set at 23° C. of less than 15% as measured according to ASTM D-395B.

2. The polyurethane reaction system as claimed in claim 1, wherein the first polyether polyol and the second polyether polyol account for a 100 wt % of a total amount of polyols in the isocyanate-reactive component.

3. The polyurethane reaction system as claimed in claim 1, wherein the second polyether polyol is a poly(tetramethylene ether) glycol.

4. The polyurethane reaction system as claimed in claim 1, wherein the second polyether polyol consists essentially of a poly(tetramethylene ether) glycol having a number average molecular weight from 980 g/mol to 2020 g/mol.

5. The polyurethane reaction system as claimed in claim 1, wherein the melting point of the second polyether polyol is between 24° C. and 34 ° C.

6. The polyurethane reaction system as claimed in claim 1, wherein the cured reaction product has a 300% tensile strength of at least 800 psi as measured according to ASTM D-638, a percent elongation at break @ 23° C. of at least 1500% as measured according to ASTM D-638, and a glass transition temperature that is below 0° C.

7. The polyurethane reaction system as claimed in claim 1, wherein the first polyether polyol has a monol content of less than 0.0200 meq/g.

8. The polyurethane reaction system as claimed in claim 1, wherein the isocyanate component is mixed with the isocyanate-reactive component without pre-heating the isocyanate-reactive component.

9. A polyurethane product having the Shore A hardness greater than 60 as measured according to ASTM D-2240, the ultimate tensile strength greater than 4500 psi as measured according to ASTM D-638, and the compression set at 23° C. of less than 15% as measured according to ASTM D-395B, the polyurethane product being prepared with the polyurethane reaction system as claimed in claim 1.

10. A method of manufacturing a polyurethane product having the Shore A hardness greater than 60 as measured according to ASTM D-2240, the ultimate tensile strength greater than 4500 psi as measured according to ASTM D-638, and the compression set at 23° C. of less than 15% as measured according to ASTM D-395B, the method comprising preparing the polyurethane reaction system as claimed in claim 1, without pre-heating the isocyanate-component prior to mixing the isocyanate component and the isocyanate-reactive component.

* * * * *